(12) United States Patent
Geist et al.

(10) Patent No.: US 7,967,549 B2
(45) Date of Patent: Jun. 28, 2011

(54) ROBOTIC SYSTEM INCLUDING FOLDABLE ROBOTIC ARM

(75) Inventors: Jason Cory Geist, Pittsburgh, PA (US); Harry Benjamin Brown, Pittsburgh, PA (US); Howie Marc Choset, Pittsburgh, PA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 12/121,137

(22) Filed: May 15, 2008

(65) Prior Publication Data
US 2009/0287352 A1  Nov. 19, 2009

(51) Int. Cl.
*B25J 18/00* (2006.01)
(52) U.S. Cl. .................................................. 414/744.5
(58) Field of Classification Search ............... 414/744.5; 901/15, 29; 74/490.01, 490.06
See application file for complete search history.

(56) References Cited

U.S. PATENT DOCUMENTS

| | | | |
|---|---|---|---|
| 4,730,975 A * | 3/1988 | Munakata | 414/735 |
| 4,908,777 A | 3/1990 | Wolfe | |
| 4,967,126 A | 10/1990 | Gretz et al. | |
| 5,420,489 A | 5/1995 | Hansen et al. | |
| 5,522,275 A * | 6/1996 | Mauletti | 74/490.03 |
| 5,534,761 A * | 7/1996 | Crippa | 318/568.1 |
| 6,003,400 A | 12/1999 | Rauchfuss | |
| 6,400,115 B1 * | 6/2002 | Yamazoe | 318/568.11 |
| 6,655,901 B2 * | 12/2003 | Tsubota et al. | 414/744.5 |
| 6,675,069 B2 * | 1/2004 | Uratani | 700/245 |
| 7,259,535 B1 | 8/2007 | Pastusak et al. | |
| 2007/0020080 A1 * | 1/2007 | Wirth | 414/744.5 |

OTHER PUBLICATIONS

Binayak Roy and H. Harry Asada, "An Underactuated Robot with a Hyper-articulated Deployable Arm Working inside an Aircraft Wing-Box" 2005 IEEE/RSJ International Conference on Intelligent Robots and Systems, ISBN 0-7803-8912-3 (Aug. 2005).
"Lightweight, low-backlash robot wrist with epicyclic drive". NASA Tech Briefs. Jan 2002.

* cited by examiner

*Primary Examiner* — Donald Underwood

(57) ABSTRACT

A system includes an end effector, a robotic wrist for orienting the end effector; and a robotic arm for positioning the end effector. The robotic arm is foldable into a stack. The robotic wrist is mounted to a last link of the robotic arm.

10 Claims, 5 Drawing Sheets

ROBOTIC SYSTEM INCLUDING FOLDABLE ROBOTIC ARM

BACKGROUND

There is a need for a robotic system that can precisely position an end effector against a work surface within a confined work space. There is also a need for the robotic system to maneuver the end effector past an access port and into the confined work space.

SUMMARY

In one embodiment, a system includes an end effector, a robotic wrist for orienting the end effector; and a robotic arm that is foldable into a stack. The robotic wrist is mounted to a last link of the robotic arm.

In another embodiment, a system includes a robotic arm having multiple links and a parallel-axis joint layout such that the links can be folded into a compact configuration with links stacked on top of each other. The system further includes a robotic wrist mounted to a last link of the robotic arm, and an end effector mounted to the robotic wrist. The robotic arm is used to position the end effector, and the robotic wrist is used to orient the end effector.

DETAILED DESCRIPTION

Figure 1:
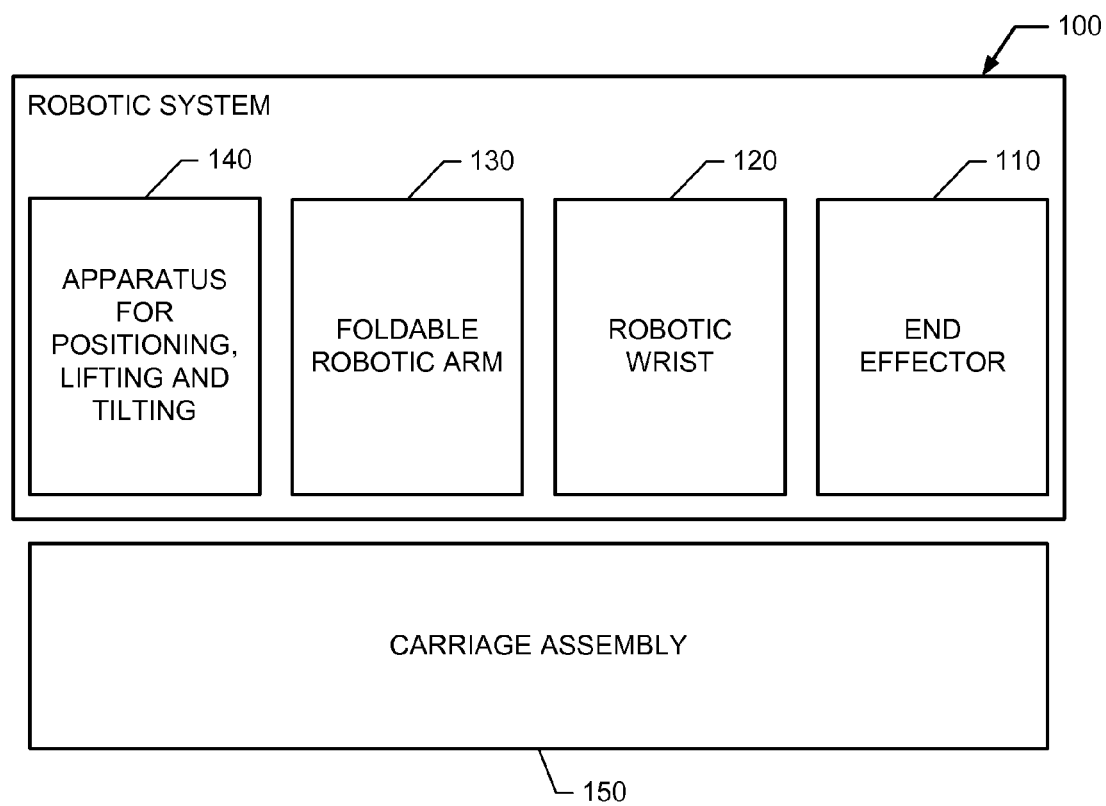
FIG. 1 is a block diagram of a robotic system.

Reference is made to FIG. 1, which illustrates a robotic system 100. The system 100 includes an end effector 110. The design of the end effector 110 depends on the task for which it is intended. For example, the end effector may be designed to support tooling for inspection (e.g., with cameras or other sensors), cutting operations (e.g., drilling, punching or milling), fastening operations (e.g., with rivets or screws), or other assembly operations.

The system 100 also includes a robotic wrist 120 for orienting the end effector 110. The robotic wrist 120 is not limited to any particular type. The range of motion and degrees of freedom in the wrist 120 is determined by how many orientations the different work surfaces have. As but one example, a spherical wrist having three degrees of freedom may be used to orient the end effector 110.

The system 100 further includes a robotic arm 130 having a plurality of links that are foldable into a stack. The robotic arm 130 may be a SCARA-type arm having multiple links and a parallel-axis joint layout (the acronym SCARA refers to a Selective Compliant Articulated Robot Arm). These joint axes may be nominally parallel to the gravity vector, thereby minimizing gravitational torques on the joints. The multiple links can be folded into a compact configuration with links stacked on top of each other.

The robotic arm 130 positions the end effector 110. The wrist 120 allows the end effector 110 to reach orientations that the robotic arm 130 might not be able to reach on its own.

The system 100 may further include an external apparatus 140 for positioning, lifting and tilting the base of the arm 130. The apparatus 140 has particular utility for a structure having a confined work space and an access port that leads to the work space. The apparatus 140 can maneuver the folded arm 130 through the access port and into the confined work space. For example, the apparatus 140 may include a base having three degrees of freedom for translating the arm 130 along a vertical axis (that is, adjusting the height of the arm 130), rotating the arm 130 about the vertical axis, and pitching to swing the entire 130 arm up and down. Once within the work space, the arm 130 can be unfolded and used to position the end effector 110 against a work surface within the work space.

Additionally, the robotic system 100 may ride on a carriage assembly 150. The carriage assembly may be used to move the system 100 along a floor to locate the system 100 with respect to the access port.

Figure 2A:
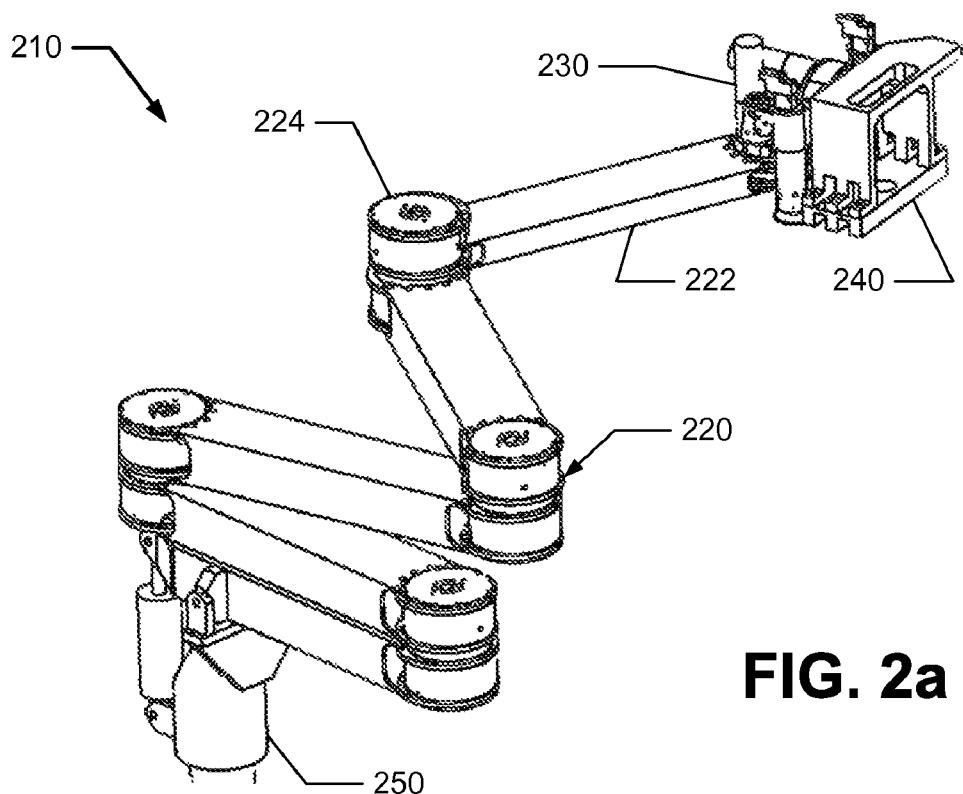
FIGS. 2a and 2b are illustrations of an embodiment of a robotic system.

Reference is now made to FIG. 2a, which illustrates an example of a robotic system 210. The robotic system 210 includes a robotic arm 220 having a plurality of links 222 connected by joints 224. The joints 224 are oriented with parallel axes. Although five links 222 of equal length are illustrated in FIG. 2a, a robotic arm described herein is not so limited.

The joints 224 may include bearings and actuators (e.g., electric motors) for folding and unfolding the arm 220. These joint axes may be nominally parallel to the gravity vector. Such an arrangement of joints can minimize gravitational torques on the joints 224. If all of the main load bearing joints are parallel to gravity, the actuator size and power requirements drop sharply.

The robotic system 210 further includes a robotic wrist 230 and an end effector 240. The robotic wrist 230 is mounted to the end of the last link. An actuator system 250 for positioning, lifting and tilting and the robotic arm 220 is also shown.

Figure 2B:
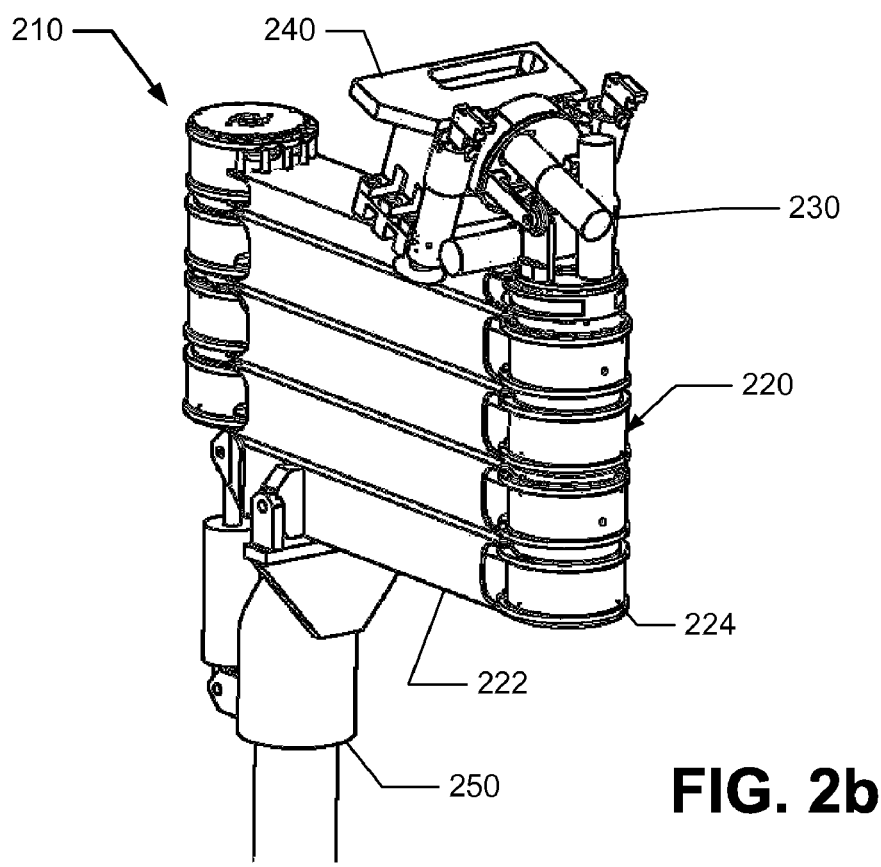

Reference is now made to FIG. 2b, which illustrates the robotic arm 210 in a compact configuration with its links 222 stacked on top of each other. The configuration of links 222 illustrated in FIG. 2b is referred to as a "coextensive stack." FIG. 2b also shows the robotic wrist 230 oriented so it and the end effector 240 are in a stowed position on the last link, making the robotic system 210 even more compact.

Figure 3:
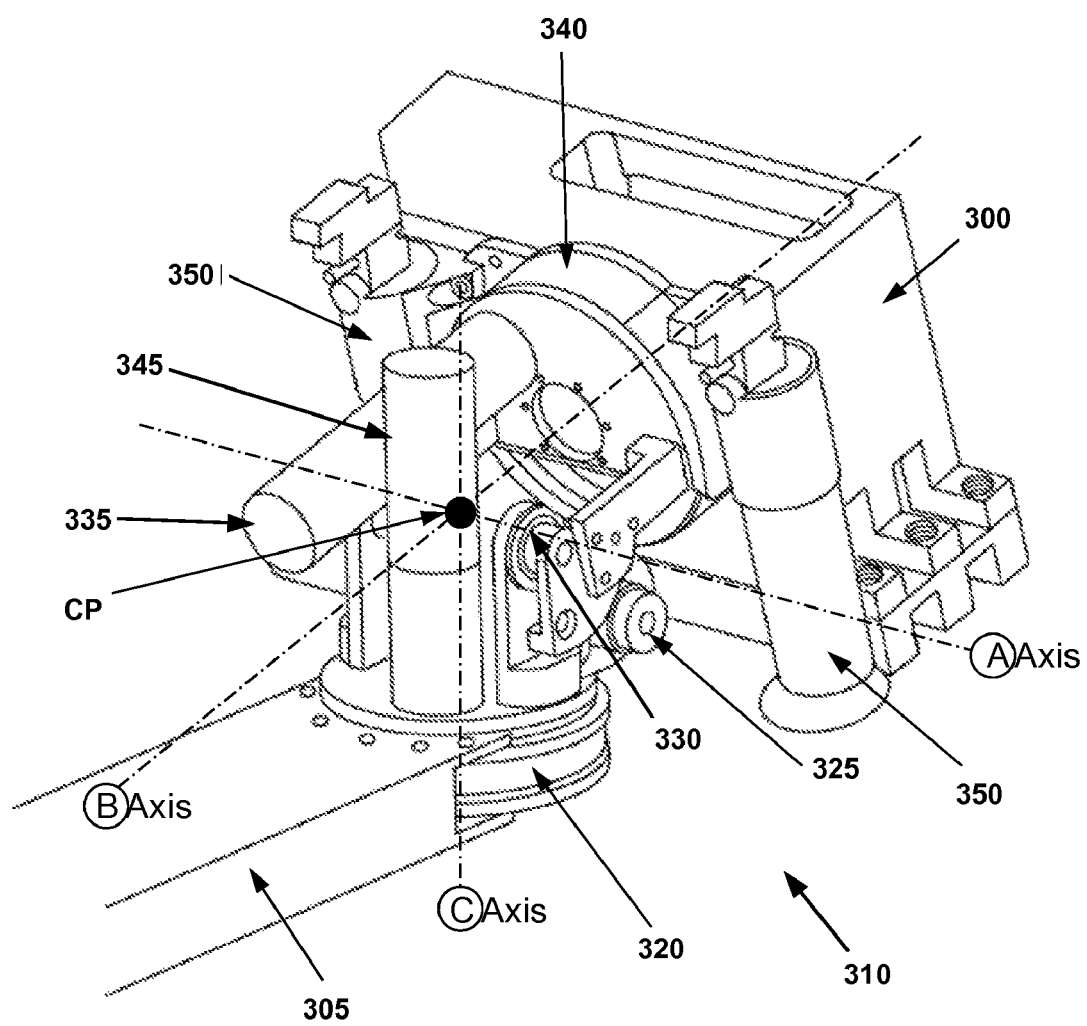
FIG. 3 is an illustration of an end effector and a robotic wrist.

Reference is made to FIG. 3, which illustrates an example of an end effector 300 and a robotic wrist 310. The robotic wrist 310 mimics the kinematics of a spherical wrist having three degrees of freedom. The wrist 310 includes first, second and third revolute joints 320, 330 and 340 for controlling pitch, yaw and roll of the end effector 300.

The third revolute joint 340 allows the end effector 300 to be rotated about a B-axis. The B-axis passes near the middle of the end effector 300 to minimize the volume swept by the end effector 300 as the third joint 340 rotates.

The second revolute joint 330 allows the end effector 300 to revolve about an A-axis. The first revolute joint 320 allows the end effector 300 to revolve about a C-axis.

The three axes intersect at a common point (i.e., an epicenter) CP, which eliminates any axis offset. Having all three axes intersecting simplifies the kinematic calculations, increases compactness and reduces the complexity of controls.

The wrist 310 further includes motors 325, 335 and 345 for driving the end effector 300 with respect to the A, B and C axes. The motors 325, 335 and 345 may be brush-type gear motors having built-in gearing such as planetary gear reducers. Placing such motors 325, 335 and 345 in the wrist 310 allows for greater modularity and serviceability of the entire robotic system. The wrist 310 is modular and self-contained. To install or remove the wrist, it need only be attached to or detached from the last link 305 of the robotic arm.

Figure 6:
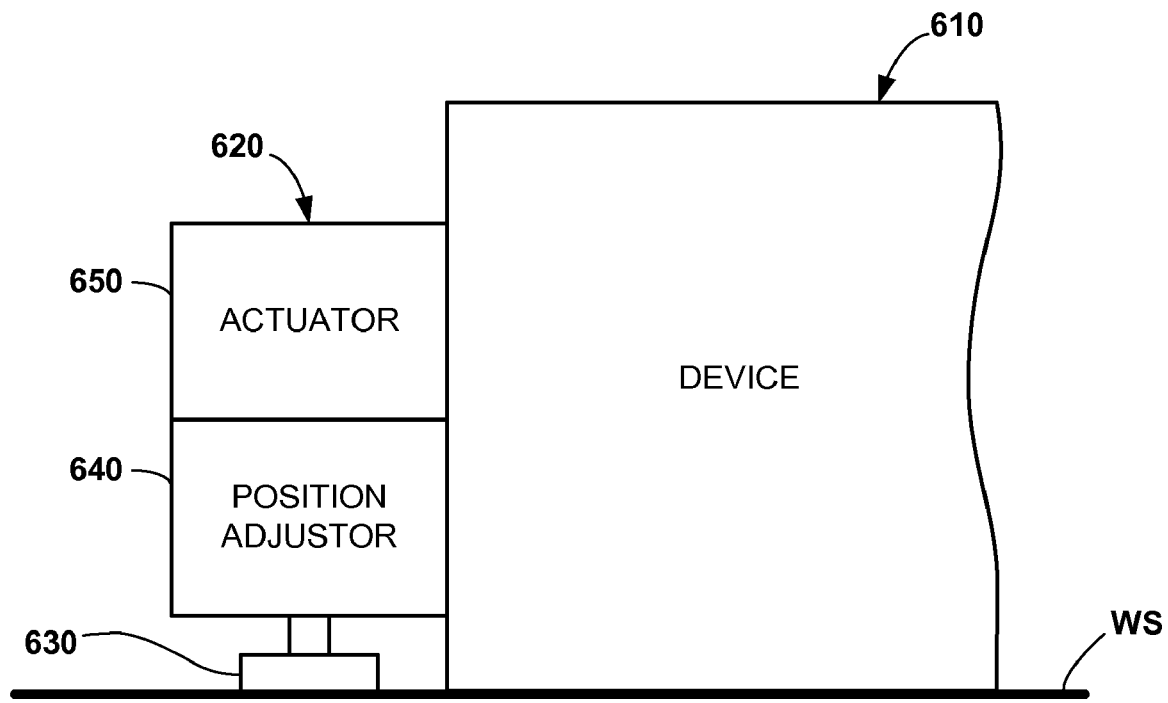
FIG. 6 is an illustration of an end effector and a fine positioner module.

Reference is made to FIG. 6, which illustrates a fine positioner module 620 at the side of an end effector 610. The fine positioner module 620 includes a contact member 630 for making contact with a surface WS. In some embodiments, the contact member 630 may include a stem that terminates in a pad or foot.

The fine positioner module 620 further includes an actuator 650 for relieving pressure of the end effector 610 against the work surface WS. In some embodiments, the actuator 650 can push the contact member 630 against the work surface WS to apply a force normal to the work surface WS. The contact between the end effector 610 and the work surface WS may be broken momentarily, but then the end effector 610 falls back into place very quickly. The contact load is largely removed so the end effector 610 can move freely relative to the work surface WS. The actuator 650 may operate by pneumatic, hydraulic, mechanical, magnetic, or by some other means.

The fine positioner module 620 further includes a position adjustor 640, which is connected through articulation to the contact member 630. The position adjustor 640 uses the contact member 630 to cause relative motion between the end effector 610 and the work surface WS.

The position adjustor 640 causes this relative motion while contact is broken between the end effector 610 and the work surface WS. This short breaking of contact allows the end effector 610 to be propelled along the work surface WS. The contact member 630 supports the normal force against the work surface WS, and thereby can generate the traction needed for movement. Thus, the single contact member 630 is not only used to cause motion along the work surface WS, but it also relieves pressure between the work surface WS and the end effector 610.

The contact member 630 may be configured to move in an orbital fashion relative to a point (e.g., a center point) of the fine positioner module 120. Orbital motion is advantageous because a single contact member 630 can move along two axes.

A robotic system described herein is not limited to any particular application. However, it is especially useful for maneuvering an end effector through an access port of a structure and into a confined space.

Figure 4:
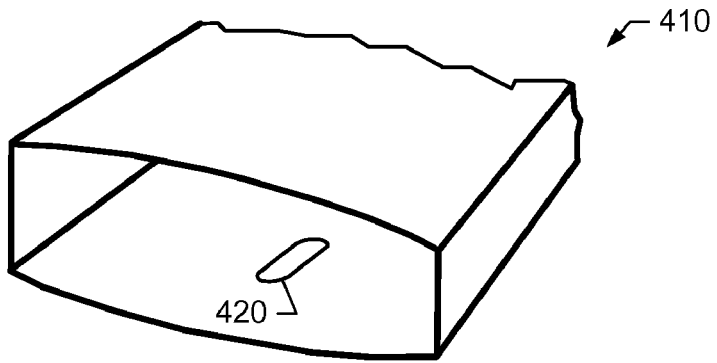
FIG. 4 is an illustration of a structure having a confined work space and an access port to the confined work space.

FIG. 4 is an illustration of a structure 410 having a confined space and an access port 420 to the confined space. For example, dimensions of a small confined space might be 1'×3'×3' while the dimensions for a large confined space might be 3'×10'×4'. Dimensions of the access port 420 to both spaces might be 9"×18".

Figure 5:
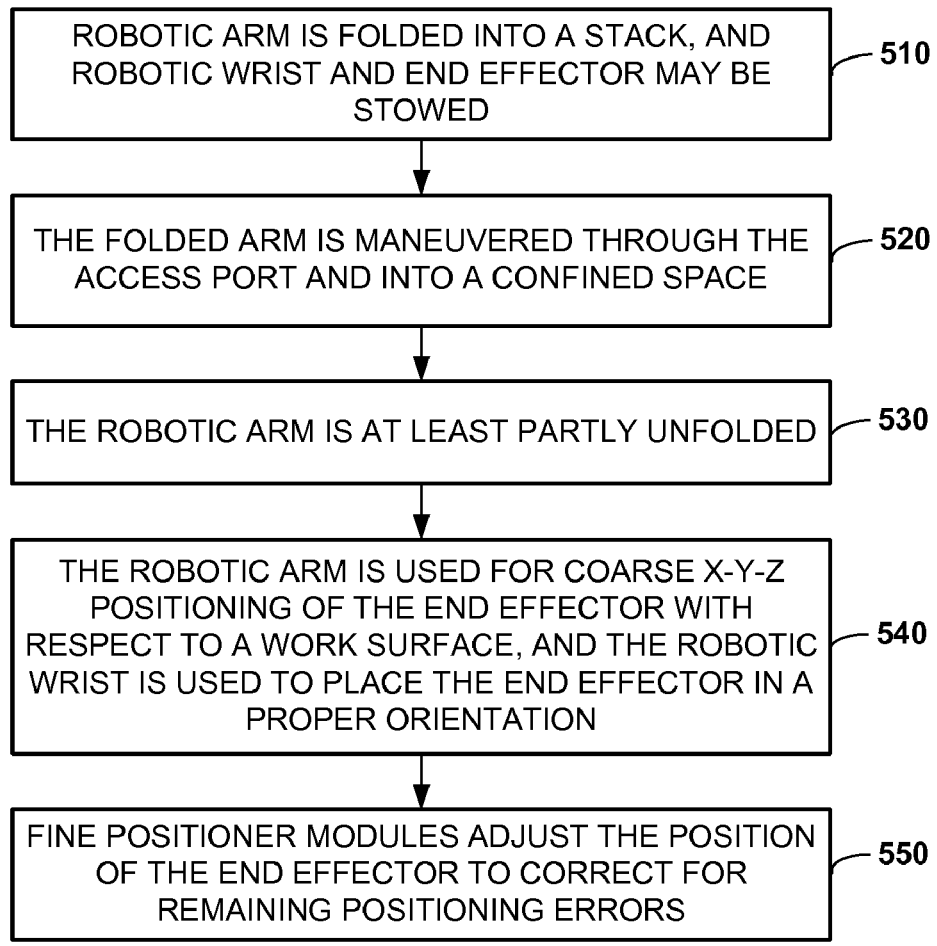
FIG. 5 is an illustration of a method of using the robotic system of FIGS. 2a-2b.

Reference is now made to FIG. 5, which illustrates a method of positioning an end effector over a target within the confined space. For example, the method can be used to position a tool center point of an end effector with respect to a hole in a work surface.

At block 510, the robotic arm is folded so that the links are compactly stacked on top of each other. In addition, the robotic wrist may be oriented so it and the end effector are stowed on the last link of the folded robotic arm. As such, the folded arm is compact enough to move though an access port.

At block 520, the folded arm is maneuvered through the access port and into the confined space. For example, the folded arm can be positioned horizontally, lifted and tilted. The arm carries the robotic wrist, fine positioner modules, and end effector inside the confined space.

At block 530, the robotic arm is at least partly unfolded once inside the confined space. Depending on the geometry of the confined space, some or all of the links may be extended.

At block 540, the robotic arm is used for coarse x-y-z positioning of the end effector with respect to a work surface, and the robotic wrist is used to place the end effector in a proper orientation. The coarse positioning may be based on measured joint angles and geometry of the arm, along with knowledge of the location and orientation of the target in space. An open loop control can determine the joint angles that place the end effector in the desired position and orientation. With knowledge of the confined space, and knowledge of the configuration and location of the robotic system, the control can predict the location of the end effector in the confined space, within the limits of component accuracy, backlash and rigidity, and servocontrol errors. Various calibration procedures may be implemented to minimize some of these errors. At the end of the coarse positioning, the end effector is coarsely positioned on the work surface, near its target position.

At block 550, the fine positioner modules adjust the position of the end effector to correct for remaining positioning errors. In some embodiments, fine control of the position of the end effector uses an image of the work surface to locate a target. Once the target has been located, the fine positioning process is invoked to move the tooling center over the target. The fine positioner modules move the end effector by momentarily breaking contact between the end effector and the work surface, while moving the end effector along the work surface. Contact members of multiple end effectors may be moved synchronously to achieve and maintain fine positioning of the end effector along the work surface. To achieve synchronous motion, the fine positioner modules may receive commands simultaneously and a generate paths locally on a precision clock.

What is claimed is:

1. A system for positioning an end effector inside a confined space that is accessible only through an access port, the system comprising:
    a robotic arm having multiple links and a parallel-axis joint layout such that the links can be folded into a compact configuration with links stacked on top of each other;
    a robotic wrist mounted to a last link of the robotic arm;
    an end effector mounted to the robotic wrist; and
    fine positioner modules attached to opposite sides of the end effector;
    the robotic arm for positioning the end effector, the robotic wrist for orienting the end effector, the fine positioner modules for performing fine adjustment of the end effector along a surface of the confined space to correct for positional errors of the arm and wrist.

2. The system of claim 1, wherein the robotic arm is foldable into a coextensive stack.

3. The system of claim 1, further comprising means for positioning, lifting and tilting the robotic arm to fit through an access port.

4. The system of claim 3, further comprising a carriage assembly for moving the system to the access port.

5. The system of claim 1, wherein the robotic wrist mimics a spherical wrist having three degrees of freedom; and wherein all rotational axes of the wrist intersect at a common point.

6. The system of claim 1, wherein each fine postitioner module includes:

a contact member for making contact with the surface of the confined space;

a position adjustor for causing the contact member to move the end effector along the surface; and an actuator for relieving pressure of the end effector against the surface while the contact member is used to move the end effector along the surface.

7. A method comprising operating the robotic system of claim 1 to position the end effector within the confined space, wherein operating the robotic system includes:

folding the robotic arm such that its links are stacked on top of each other;

maneuvering the folded arm through the access port and into the confined space;

at least partially unfolding the arm within the confined space;

using the arm and the robotic wrist to position and orient the end effector over a target within the confined space; and using the fine positioner module to correct for positional errors of the arm and wrist.

8. The method of claim 7, further comprising stowing the robotic wrist and end effector on a last link of the folded robotic arm prior to maneuvering the folded arm through the access port.

9. The system of claim 1, wherein the robotic wrist mimics a spherical wrist having three degrees of freedom; and wherein all rotational axes of the wrist intersect at a common point.

10. The system of claim 1, wherein the fine positioner modules position the end effector while the arm and wrist are pressing the end effector against the surface.

* * * * *